US012713038B2

(12) United States Patent
Ni et al.

(10) Patent No.: US 12,713,038 B2
(45) Date of Patent: Aug. 18, 2026

(54) TRANSFORMATION PROCESS FOR VIDEO CODING

(71) Applicant: Samsung Electronics Co., Ltd., Suwon-si (KR)

(72) Inventors: Saifeng Ni, Santa Clara, CA (US); Madhukar Budagavi, Plano, TX (US); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/924,941

(22) Filed: Oct. 23, 2024

(65) Prior Publication Data

US 2025/0254338 A1 Aug. 7, 2025

Related U.S. Application Data

(60) Provisional application No. 63/550,921, filed on Feb. 7, 2024.

(51) Int. Cl.
*H04N 19/176* (2014.01)
*H04N 19/124* (2014.01)
*H04N 19/159* (2014.01)
*H04N 19/18* (2014.01)
*H04N 19/186* (2014.01)
*H04N 19/70* (2014.01)

(52) U.S. Cl.
CPC ......... *H04N 19/176* (2014.11); *H04N 19/124* (2014.11); *H04N 19/159* (2014.11); *H04N 19/18* (2014.11); *H04N 19/186* (2014.11); *H04N 19/70* (2014.11)

(58) Field of Classification Search
CPC .. H04N 19/176; H04N 19/124; H04N 19/159; H04N 19/18; H04N 19/186; H04N 19/70
See application file for complete search history.

(56) References Cited

U.S. PATENT DOCUMENTS

2021/0385499 A1* 12/2021 Zhang .................. H04N 19/176
2023/0224454 A1* 7/2023 Dumas ................. H04N 19/176
375/240.02

* cited by examiner

*Primary Examiner* — Jae N Noh

(57) ABSTRACT

An apparatus directed to improvements of the low-frequency non-separable secondary transform (LFNST) process is provided. The apparatus receives a compressed bitstream including one or more syntax elements for transform coefficients for a current block. The apparatus decodes the one or more syntax elements for transform coefficients to generate transform coefficients and dequantizes the transform coefficients to generate dequantized transform coefficients for the current block. The apparatus derives an LFNST matrix based on a block type of the current block, and performing an LFNST process by applying the derived LFNST matrix to the dequantized transform coefficients to generate transformed samples for the current block. The apparatus transforms the transformed samples to generate residual samples for the current block.

20 Claims, 9 Drawing Sheets

FIG. 2

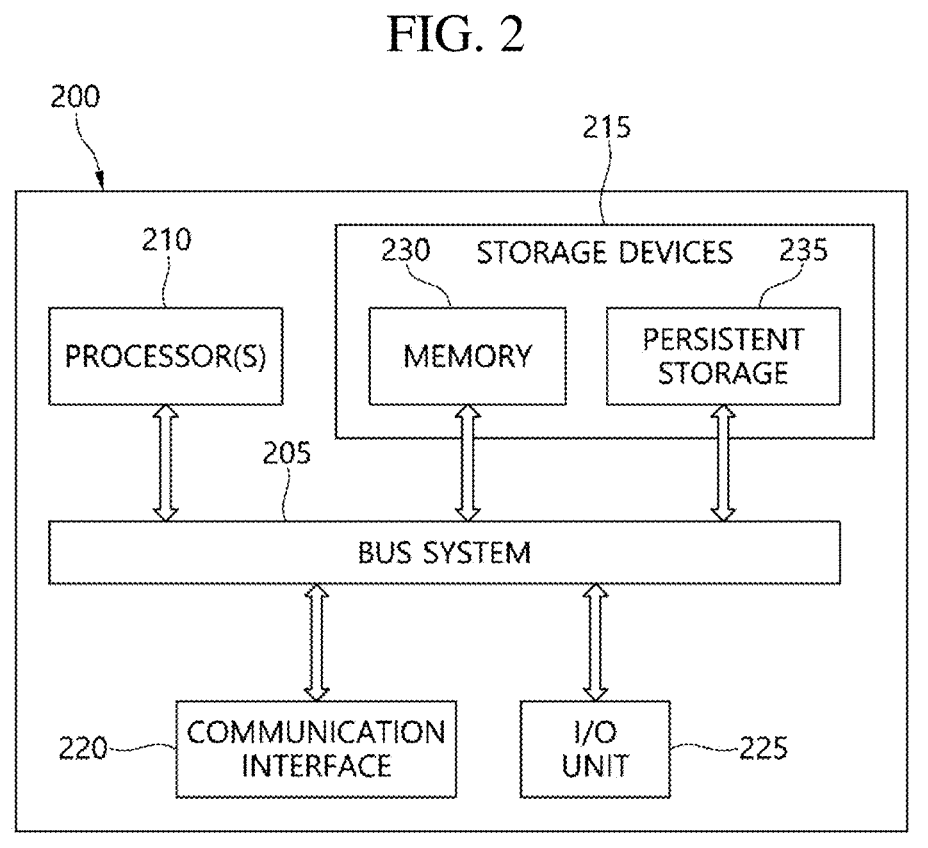

200
215
210
230
STORAGE DEVICES
235
PROCESSOR(S)
MEMORY
PERSISTENT STORAGE
205
BUS SYSTEM
220
COMMUNICATION INTERFACE
I/O UNIT
225

PRIMARY TRANSFORMATION PROCESSOR

620

LFNST PROCESSOR

TRANSFORMATION PROCESS FOR VIDEO CODING

CROSS REFERENCE TO RELATED APPLICATION

This application claims benefit of U.S. Provisional Application No. 63/550,921 filed on Feb. 7, 2024 in the United States Patent and Trademark Office, the entire contents of which are hereby incorporated by reference.

TECHNICAL FIELD

The disclosure relates to video coding, and more particularly to, for example, but not limited to, transformation process for video coding.

BACKGROUND

Transform Coding has been an essential part of many practical video codecs e.g., High-Efficiency Video Coding (HEVC) and Versatile Video Coding (VVC) for achieving a high compression ratio. In the past few decades, the transform coding was based on the traditional discrete cosine transform (DCT) due to the reasonable tradeoff between coding performance and complexity. DCT-2 has been proved to approximate the optimal data-driven Karhunen-Loeve transform (KLT). The major transform coding tools beyond HEVC may be categorized into primary transform, secondary transform and transform partitioning. Many advanced transform technologies have been added in VVC, such as multiple transform set (MTS) and low-frequency non-separable secondary transform (LFNST).

Since DST-7 and DCT-8 have been found to be more efficient than DCT-2 for uneven residual distribution, DST-7 and DCT-8 have been introduced as alternative transform types besides DCT-2 in primary transform and used in Multiple Transform Selection (MTS), Intra Sub-Partitioning (ISP) and Sub-block Transform (SBT). In VVC, there are 5 types of different combinations for transform, including (DCT-2, DCT-2), (DST-7, DST-7), (DST-7, DCT-8), (DCT-8, DST-7) and (DST-8, DST-8).

The LFNST is a non-separable transform utilized to further remove spatial redundancy for the low frequency primary transform coefficients. The forward LFNST process is applied as a secondary transform process between the forward primary transform process and the quantization process at the encoder side, and the inverse LFNST process is applied as an inverse secondary transform process between de-quantization process and the inverse primary transform inverse. The LFNST is a non-separable transform process applied after the primary transform process is performed to further reduce redundancy. The LFNST transform process may be expressed in the form of matrix multiplication. The same sets of LFNST transformation matrices are used in all circumstances in the VVC standard.

However, using the same LFNST transformation matrix in all circumstances may deteriorate video compression efficiency because different features of a current block or a current picture can make different patterns of transform coefficients.

The description set forth in the background section should not be assumed to be prior art merely because it is set forth in the background section. The background section may describe aspects or embodiments of the present disclosure.

SUMMARY

The present disclosure is directed to improvements of video coding. In particular, the present disclosure is directed to improvements of transformation process for video coding. More particularly, the present disclosure is directed to improvements of low-frequency non-separable secondary transform (LFNST) process. In some embodiments, more appropriate sets of LFNST transformation for different circumstances may be introduced to further improve the coding performance.

In some embodiments, an apparatus comprises: a communication interface configured to receive a compressed bitstream including one or more syntax elements for transform coefficients for a current block; and a processor operably coupled to the communication interface, the processor configured to cause: decoding the one or more syntax elements for transform coefficients to generate transform coefficients for the current block, dequantizing the transform coefficients to generate dequantized transform coefficients for the current block, deriving a low frequency non-separable secondary transform (LFNST) matrix based on a block type of the current block, performing an LFNST process by applying the derived LFNST matrix to the dequantized transform coefficients to generate transformed samples for the current block, and transforming the transformed samples to generate residual samples for the current block.

In some embodiments, the block type specifies a color component indicating whether the current block is a luma block or a chroma block.

In some embodiments, the LFNST matrix is derived further based on a coding parameter.

In some embodiments, the transform coefficients are dequantized based on a quantization parameter, and the coding parameter indicates the quantization parameter.

In some embodiments, the processor is further configured to cause: determining a quantization parameter segment information indicating which segment the quantization parameter belongs to, and the LFNST matrix is derived further based on the quantization parameter segment information.

In some embodiments, the LFNST matrix is derived further based on a feature of an input video.

In some embodiments, the feature of the input video indicates a resolution of the input video.

In some embodiments, the processor is further configured to cause: determining an LFNST index based on a syntax element in the compressed bitstream, and the LFNST matrix is derived further based on the LFNST index.

In some embodiments, the processor is further configured to cause: performing an intra prediction process based on an intra prediction mode to generate prediction samples for the current block, and the LFNST matrix is derived further based on the intra prediction mode.

In some embodiments, the processor is further configured to cause: combining the residual samples with the prediction samples to generate reconstructed samples for the current picture including the current block.

In some embodiments, a video decoding method comprises: receiving a compressed bitstream including one or more syntax elements for transform coefficients for a current block; decoding the one or more syntax elements for transform coefficients to generate transform coefficients for the current block; dequantizing the transform coefficients to generate dequantized transform coefficients for the current block; deriving a low frequency non-separable secondary transform (LFNST) matrix based on a block type of the current block; performing an LFNST process by applying the derived LFNST matrix to the dequantized transform coefficients to generate transformed samples for the current block; and transforming the transformed samples to generate residual samples for the current block.

In some embodiments, the block type specifies a color component indicating whether the current block is a luma block or a chroma block.

In some embodiments, the transform coefficients are dequantized based on a quantization parameter, and the LFNST matrix is derived further based on the quantization parameter.

In some embodiments, the LFNST matrix is derived further based on a resolution of an input video.

In some embodiments, the video decoding method further comprises: performing an intra prediction process based on an intra prediction mode to generate prediction samples for the current block; and combining the residual samples with the prediction samples to generate reconstructed samples for the current picture including the current block, wherein the LFNST matrix is derived further based on the intra prediction mode.

In some embodiments, an apparatus comprises: a processor configured to cause: transforming residual samples for a current block to generate transformed samples for the current block, deriving a low frequency non-separable secondary transform (LFNST) matrix based on a block type of the current block, applying the derived LFNST matrix to the transformed samples to generate transform coefficients for the current block, quantizing the transform coefficients to generate quantized transform coefficients for the current block, and encoding with the quantized transform coefficients to generate one or more syntax elements for quantized transform coefficients for the current block; and a communication interface operably coupled to the processor, the communication interface configured to transmit the compressed bitstream including the one or more syntax elements for quantized transform coefficients for the current block.

In some embodiments, the block type specifies a color component indicating whether the current block is a luma block or a chroma block.

In some embodiments, the transform coefficients are dequantized based on a quantization parameter, and the LFNST matrix is derived further based on the quantization parameter.

In some embodiments, the LFNST matrix is derived further based on a resolution of an input video.

In some embodiments, the processor is further configured to cause: performing an intra prediction process based on an intra prediction mode to generate prediction samples for the current block; and generating the residual samples for the current block based on the prediction samples and original samples for the current block, wherein the LFNST matrix is derived further based on the intra prediction mode.

In some embodiments, different sets of transformation matrices for luma and chroma blocks may be designed and utilized, which can improve the coding gain by 0.07% (Y) in all intra modes compared to the VVC test model 19.2 (VTM-19.2). Furthermore, in some embodiments, different sets of transformation matrices based on QP setting may also be utilized, which can improve the coding gain by 0.08% (Y) in all intra modes compared to the VTM software. When different sets of transformation matrices for Luma/Chroma and for different QP setting are utilized, the coding gain can be further improved by 0.09% (Y) in all intra modes compared to the VTM software. Moreover, in some embodiments, adaptive LFNST transformation sets for different video resolutions may also be utilized, which can improve the coding performance by 0.1% (Y) in all intra modes compared to the VTM software.

BRIEF DESCRIPTION OF THE DRAWINGS

FIGS. 2 and 3 illustrate example electronic devices in accordance with an embodiment of this disclosure.

FIG. 5 illustrates a block diagram for a video decoder in accordance with an embodiment.

Figure 1:
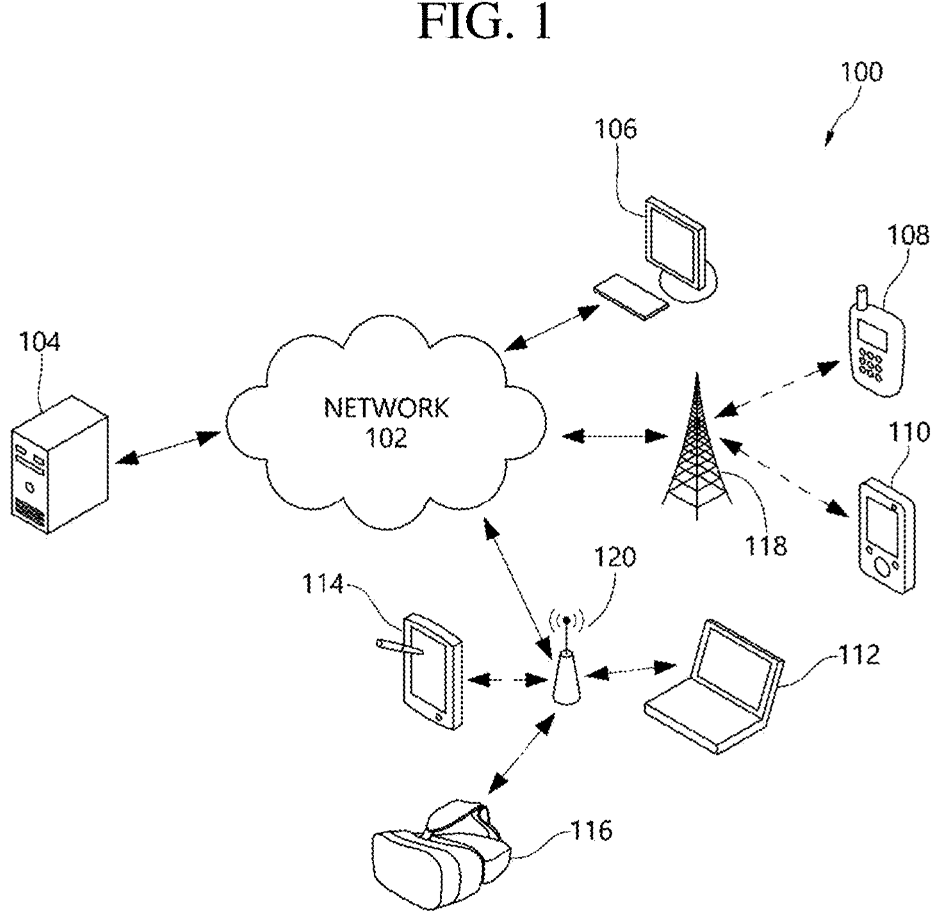
FIG. 1 illustrates an example communication system 100 in accordance with an embodiment of this disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 3:
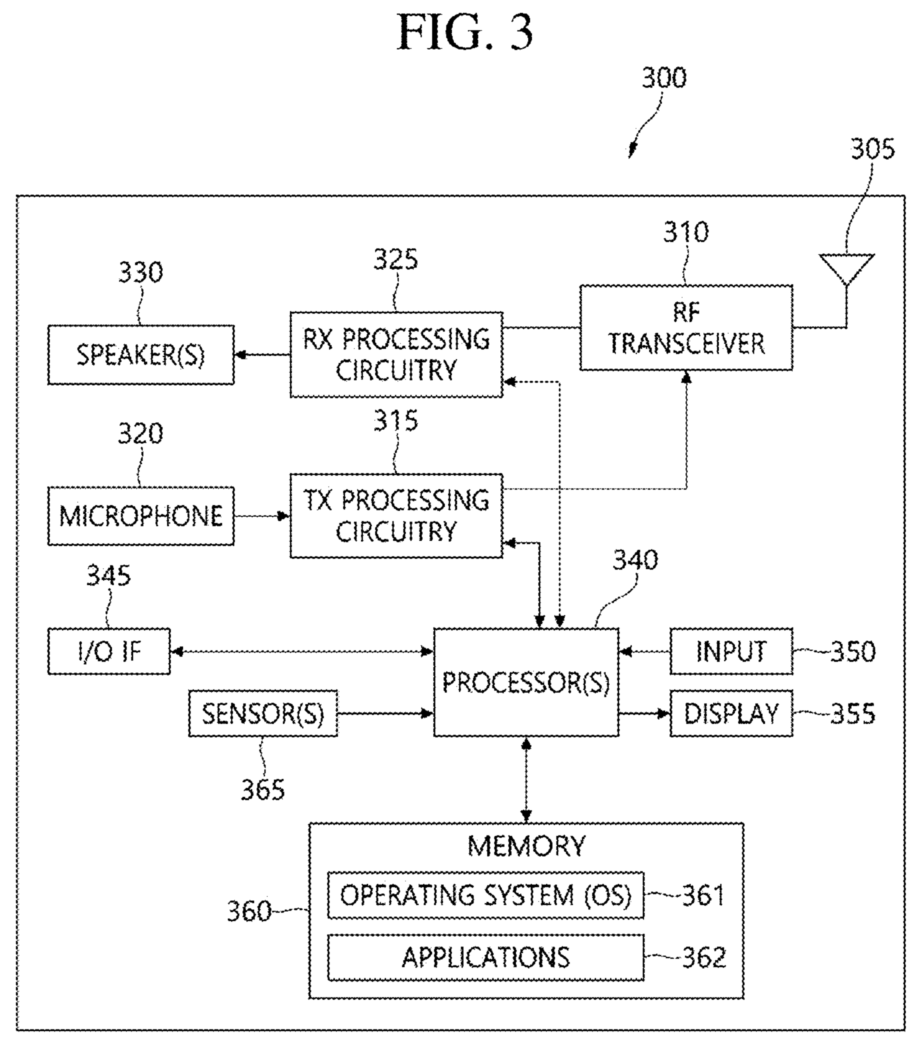

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
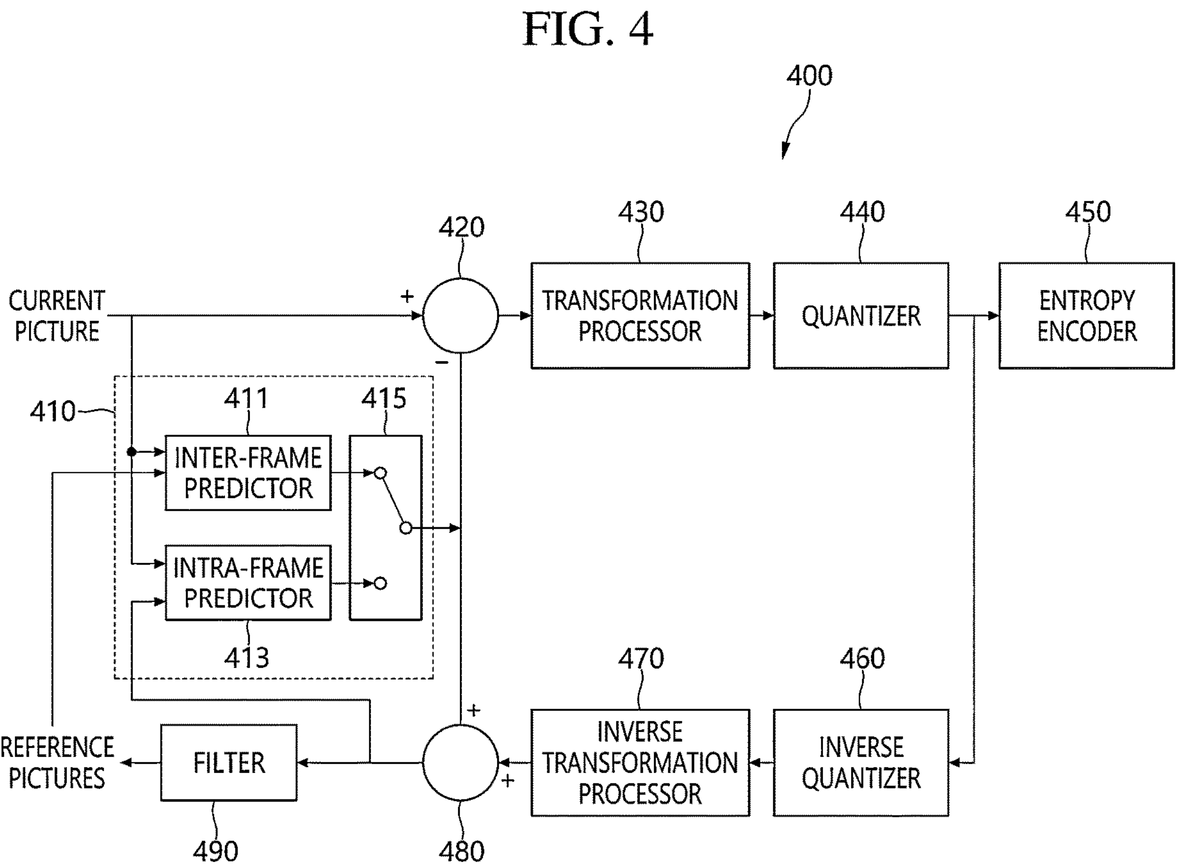
FIG. 4 illustrates a block diagram for a video encoder in accordance with an embodiment.

FIG. 4 illustrates a block diagram for a video encoder in accordance with an embodiment.

The video encoder 400 comprises a prediction unit 410, a residual sample generator 420, a transformation processor 430, a quantizer 440, an entropy encoder 450, an inverse quantizer 460, an inverse transformation processor 470, a picture reconstructor 480, and a filter 490.

The prediction unit 410 performs a prediction process to generate prediction samples for the current block. In some embodiments, as shown in FIG. 4, the prediction unit 410 may comprise an inter-frame predictor 411, an intra-frame predictor 413, and a switch 415.

The inter-frame predictor 411 performs an inter prediction process based on a current picture and one or more reference pictures to generate inter-predicted samples for a current block. The inter-frame predictor may generate a reference picture index indicating a reference picture including the inter-predicted samples and a motion vector indicating the inter-predicted samples in the reference picture indicated by the reference picture index.

The intra-frame predictor 413 performs an intra prediction process based on the current picture and reconstructed samples of previously encoded samples of the current picture to generate intra-predicted samples for the current block.

The switch 415 selects prediction samples for the current block between the inter-predicted samples and the intra-predicted samples. In some embodiments, the switch 415 may determine a prediction mode between an intra prediction mode and an inter prediction mode and select prediction samples based on the prediction mode.

The residual sample generator 420 subtracts the prediction samples selected by the switch 415 from original samples for a current block to generate residual samples for the current block.

The transformation processor 430 transforms residual samples for the current block to generate transform coefficients for the current block.

The quantizer 440 quantizes transform coefficients for the current block to generate quantized transform coefficients for the current block.

The entropy encoder 450 performs entropy encoding with the quantized transform coefficients for the current block to generate a bitstream.

The inverse quantizer 460 dequantizes quantized transform coefficients for the current block to generate dequantized transform coefficients for the current block.

The inverse transformation processor 470 transforms dequantized transform coefficients for the current block to generate inversely transformed residual samples for the current block.

The picture reconstructor 480 combines the inversely transformed residual samples for the current block with the prediction samples selected by the switch 415 to generate reconstructed samples for the current picture including the current block.

The filter 490 performs one or more filtering operations on the reconstructed samples to generate modified reconstructed samples for the current picture. The reconstructed samples for the current picture are used as a reference picture for inter-frame prediction of the subsequent pictures.

Figure 5:
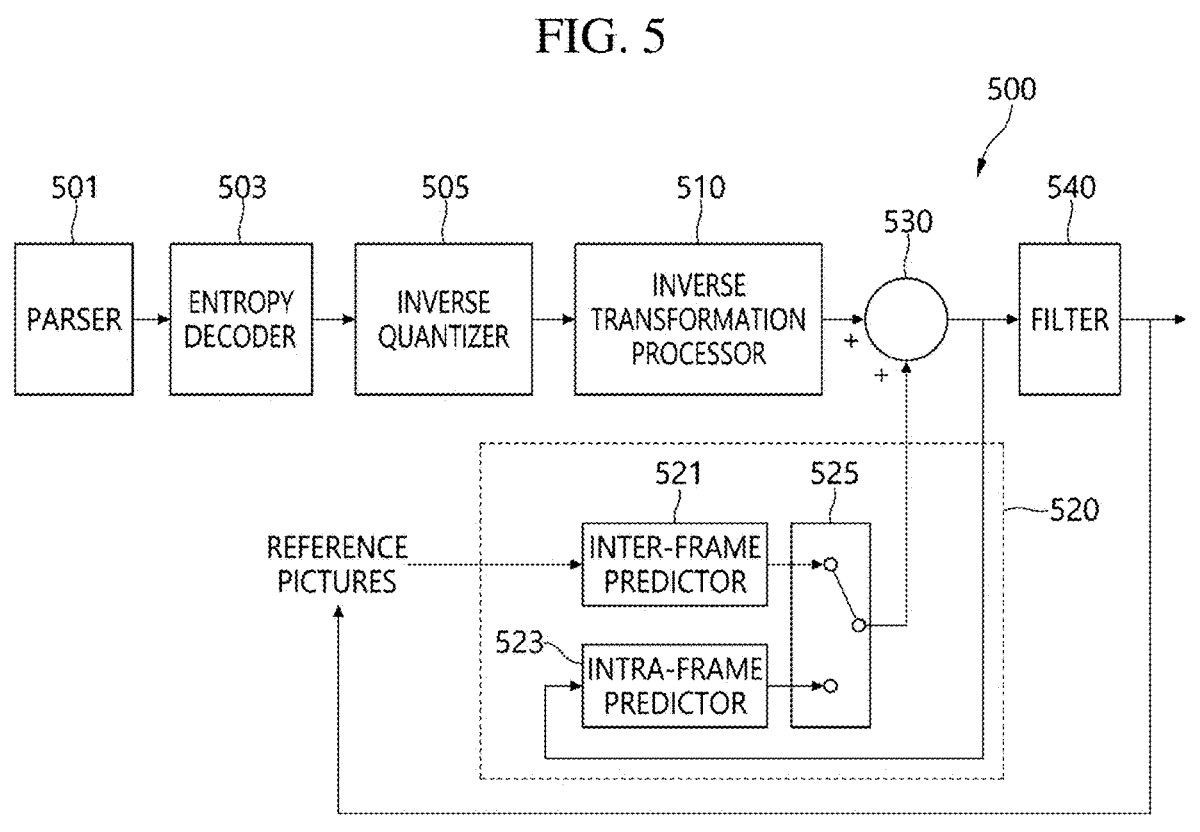

FIG. 5 illustrates a block diagram for a video decoder in accordance with an embodiment.

The video decoder 500 comprises a parser 501, an entropy decoder 503, an inverse quantizer 505, an inverse transformation processor 510, a prediction unit 520, a picture reconstructor 530, and a filter 540.

The parser 501 parses a bitstream to generate one or more syntax elements for transform coefficients for a current block.

The entropy decoder 503 entropy-decodes the one or more syntax elements for transform coefficients to generate transform coefficients for the current block.

The inverse quantizer 505 dequantizes transform coefficients for the current block based on a quantization parameter to generate dequantized transform coefficients for the current block.

The inverse transformation processor 510 transforms dequantized transform coefficients for the current block to generate residual samples for the current block.

The prediction unit 520 performs a prediction process to generate prediction samples for the current block. In some embodiments, as shown in FIG. 5, the prediction unit 520 comprises an inter-frame predictor 521, an intra-frame predictor 523, and a switch 525.

The inter-frame predictor 521 performs an inter prediction process based on one or more reference pictures indicated by one or more reference picture indices signaled in the bitstream and based on one or more motion vectors signaled in the bitstream to generate inter-predicted samples for the current block.

The intra-frame predictor 523 performs an intra prediction process based on reconstructed samples of previously decoded samples of the current picture and based on an intra prediction mode to generate intra-predicted samples for the current block.

The switch 525 selects prediction samples for the current block between the inter-predicted samples and the intra-predicted samples. In some embodiments, the switch 525 may determine a prediction mode between an intra prediction mode and an inter prediction mode and select prediction samples based on the prediction mode. In some embodiments, the switch 525 may select an intra-predicted samples as the prediction samples when the prediction mode indicates an intra prediction and select an inter-predicted samples as the prediction samples when the prediction mode indicates an inter prediction.

The picture reconstructor 530 combines the residual samples with the prediction samples to generate reconstructed samples for the current picture including the current block.

The filter 540 applies at least one of a plurality of filters to reconstructed samples for the current picture to generate modified reconstructed samples for the current picture. The reconstructed samples for the current picture are used as a reference picture for inter-frame prediction of the subsequent pictures.

Hereinafter, the intra prediction process will be described.

Intra prediction process exploits spatial correlation within a picture or within a picture region. In order to improve coding efficiency, the High-Efficiency Video Coding (HEVC) standard and Versatile Video Coding (VVC) standard exploit block-based spatial prediction extensively. In VVC, multiple Intra prediction modes are used to exploit spatial features. The size of the prediction unit (PU) for Intra coding may be 1×16, 1×32, 2×8, 2×16, 2×32, 4×4, 4×8, 4×16, 4×32, 8×8, 8×16, 8×32, 16×16, 16×32, 16×64, 32×32, 64×64. The number of Intra angular modes increased to 65 with block shape-adaptive directions.

In the intra prediction in video coding standards such as Advanced Video Coding (AVC) and HEVC, the samples in the current block are predicted from already reconstructed left and top neighboring samples of the current block, referred to as reference samples. VVC has angular intra prediction as well. In comparison to HEVC, VVC increased the prediction accuracy by enlarging the number of angular prediction directions and also by more accurate interpolation filters. While the HEVC standard uses 33 directional modes, the VVC standard uses 65 directional modes. Besides that, VVC also adopted new partitioning framework by introducing wide-angular intra prediction modes which can deal with blocks with rectangular shape, where more prediction directions are assigned to the longer side of a block. The additional modes on the longer side are called Wide-Angle Intra Prediction (WAIP) mode.

Similar to HEVC, intra prediction in VVC has two filtering mechanisms applied on reference samples: reference sample smoothing and interpolation filtering. Reference sample smoothing is applied only to integer-slope mode for luma blocks while interpolation filtering is applied on fractional-slope mode. 4-tap interpolation filters including a discrete cosine transform (DCT)-based interpolation filter (DCTIF) and a 4-tap smoothing interpolation filter (SIF) are used for luma blocks.

The Matrix-based Intra Prediction (MIP) mode is a new concept of intra prediction proposed in VVC, which is a data-driven method. There are 3 main steps for MIP in VVC standard. The first step is reference sample down sampling, where the top and left reference samples are reduced to a smaller size. The reference boundary is reduced to 2 for 4×4 blocks and to 4 for all the other blocks. In current VVC standard, the averaging of reference samples is used for the down sampling process. After that, two reduced boundary samples are concatenated and transformed based on mipTranspose. The second step is to do matrix vector multiplication based on the mipSizeId and mode k. The number of MIP modes is equal to 16 for mipSizeId=0, equal to 8 for mipSizeId=1 and equal to 6 for mipSizeId=2. With the additional indicator mipTranspose, the actual number of modes for each mipSizeId is doubled. The mode k of a MIP block is searched in encoder and signaled in decoder. After the matrix and vector multiplication, a reduced prediction is generated. The reduced prediction size is 4×4 for mipSizeId=0 and 1 and 8×8 for mipSizeId=2. The last step is to do two rounds of linear interpolation, first a horizontal and then a vertical, to up sample the reduced prediction to a full prediction.

Hereinafter, position-dependent intra prediction sample filtering process in VVC will be described.

The position-dependent prediction combination (PDPC) has been introduced in the VVC standard. The PDPC is a filtering technique applied to the intra prediction of Planar, DC, horizontal, vertical intra models and also certain angular modes. The filter has position-dependent weights to adjust the prediction. It is disabled if the block width or height is smaller than 4 samples, or if the MRL mode is used, or if BDPCM is used.

If PDPC is applied, the prediction at (x, y) is calculated as shown in Equation 1.

$$P(x, y) = (w_L R_L + w_T R_T + (64 - w_L - w_T)P(x, y) + 32) \gg 6 \quad \text{Equation 1}$$

In Equation 1, $w_L$ and $w_T$ are positional dependent weights, $R_L$ and $R_T$ are neighboring reference samples at the left and top of the current block.

The reference samples $R_L$ and $R_T$ and position dependent weights $w_L$ and $w_T$ for Planar and DC modes in VVC are as shown in Equation 2.

$$R_L = R(-1, y) \quad \text{Equation 2}$$

$$R_T = R(x, -1)$$

$$w_L = 32 \gg ((y \ll 1) \gg \text{scale})$$

$$w_T = 32 \gg ((x \ll 1) \gg \text{scale})$$

scale=$(\log_2 w+\log_2 h-2)$»2, where w and h are the width and height of the block, R is the reference sample, (x, y) are the pixel coordinates inside the block.

In Equation 2, x»y represents arithmetic right shift of a two's complement integer representation of x by y binary digits. x«y represents arithmetic left shift of a two's complement integer representation of x by y binary digits The reference samples $R_L$ and $R_T$ and position dependent weights $w_L$ and $w_T$ for horizontal and vertical intra modes in VVC are determined as shown in Equation 3.

$$R_L = R(-1, y) - R(-1, -1) + P(x, y) \quad \text{Equation 3}$$

$$R_T = R(x, -1) - R(-1, -1) + P(x, y)$$

$$w_L = \begin{cases} 32 \gg ((y \ll 1) \gg \text{scale}) & \text{if Vertical Intra Modes} \\ 0 & \text{else} \end{cases}$$

$$w_T = \begin{cases} 32 \gg ((x \ll 1) \gg \text{scale}) & \text{if Horizontal Intra Modes} \\ 0 & \text{else} \end{cases}$$

$$\text{scale} = (\log_2 w + \log_2 h - 2) \gg 2$$

The reference samples $R_L$ and $R_T$ and position dependent weights $w_L$ and $w_T$ for angular intra modes greater than or equal to 51 in VVC are determined as shown in Equation 4.

$$yIntercept = y + (((x + 1) \times invAng + 256) \gg 9) \quad \text{Equation 4}$$

$$\text{scale} = \min(2, \log_2 h - \text{floor}\ (\log_2(3 \times invAng - 2)) + 8)$$

$$R_L = \begin{cases} R(-1, yIntercept & \text{if } x < (3 \ll \text{scale}) \\ 0 & \text{else} \end{cases}$$

$$R_T = 0$$

$$w_L = 32 \gg ((x \ll 1) \gg \text{scale})$$

$$w_T = 0$$

In Equation 4, min (x, y) returns the smallest number between x and y, and floor (x) returns the largest integer less than or equal to x.

Figure 11:
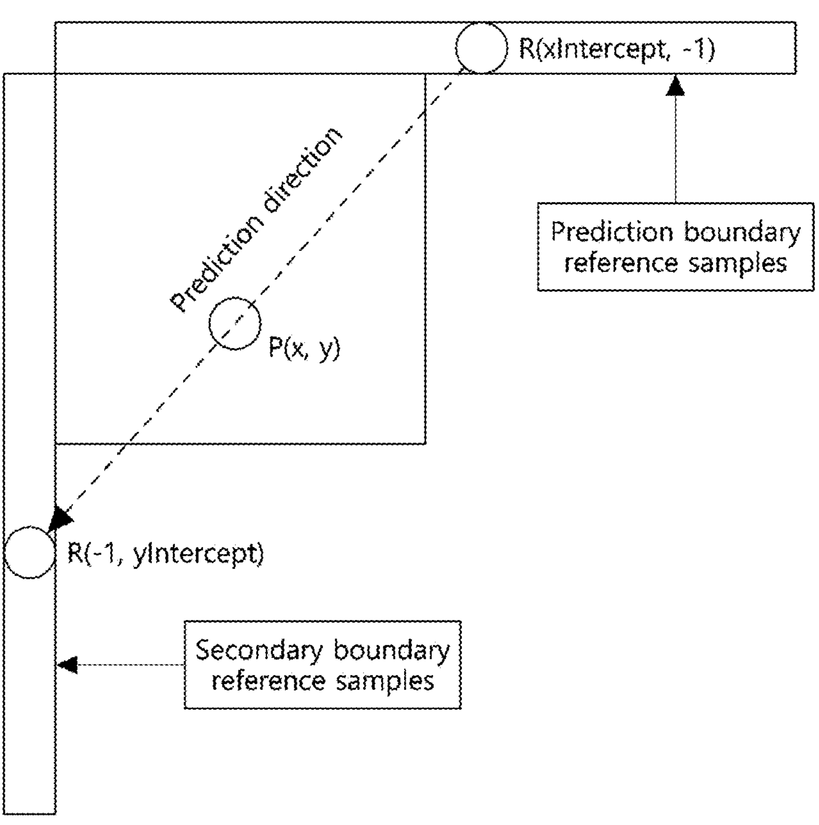
FIG. 11 shows an x-intercept and a y-intercept of a sample.

If angle mode is less than or equal to 17, the x-intercept with the reference boundary is calculated based on the prediction direction as shown in FIG. 11. The reference samples and weights are computed similarly to Equation 4.

FIG. 11 shows an x-intercept and a y-intercept of a sample.

As shown in FIG. 11, the variable xIntercept indicating an x-intercept for PDPC of a current sample P(x, y) in a current block may represent a horizontal sample position of a top boundary reference sample R(xIntercept, −1) where a line which crosses the current sample P(x, y) and whose slope is the prediction direction of the current sample intersects a top boundary line formed by top boundary reference samples of the current block. The variable yIntercept indicating an y-intercept for PDPC of the current sample P(x, y) in a current block may represent a vertical sample position of a left reference sample R(−1, yIntercept) where a line which crosses the current sample P(x, y) and whose slope is the prediction direction of the current sample intersects a left boundary line formed by left boundary reference samples of the current block.

Hereinafter, a transformation processor in accordance with an embodiment will be described with reference to FIG. 6.

Figures 6, 7:
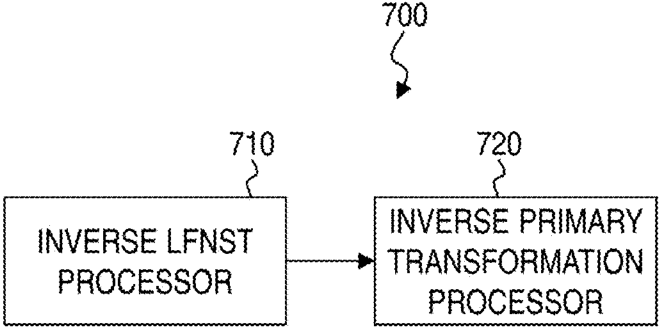
FIG. 6 shows a block diagram for a transformation processor in accordance with an embodiment.
FIG. 7 shows a block diagram for an inverse transformation processor in accordance with an embodiment.

FIG. 6 shows a block diagram for a transformation processor in accordance with an embodiment.

The transformation processor 600 as shown in FIG. 6 may correspond to the transformation processor 430 of FIG. 4. As shown in FIG. 6, the transformation processor 600 may comprise a primary transformation processor 610 and an LFNST processor 620.

The primary transformation processor 610 may transform residual samples for the current block to generate transformed samples for the current block.

The LFNST processor 620 may perform a forward LFNST process with the transformed samples for the current block as inputs to generate transform coefficients for the current block.

Hereinafter, an inverse transformation processor in accordance with an embodiment will be described with reference to FIG. 7.

FIG. 7 shows a block diagram for an inverse transformation processor in accordance with an embodiment.

The inverse transformation processor 700 as shown in FIG. 7 may correspond to the inverse transformation processor 470 of FIG. 4 and the inverse transformation processor 510 of FIG. 5. As shown in FIG. 7, the inverse transformation processor 700 may comprise an inverse LFNST processor 710 and an inverse primary transformation processor 720.

The inverse LFNST processor 710 may perform an inverse LFNST process with dequantized transform coefficients for the current block as inputs to generate transformed samples for the current block.

The inverse primary transformation processor 720 may transform the transformed samples for the current block to generate residual samples for the current block.

Hereinafter, forward LFNST and inverse LFNST in accordance with an embodiment will be described with reference to FIG. 8.

Figure 8:
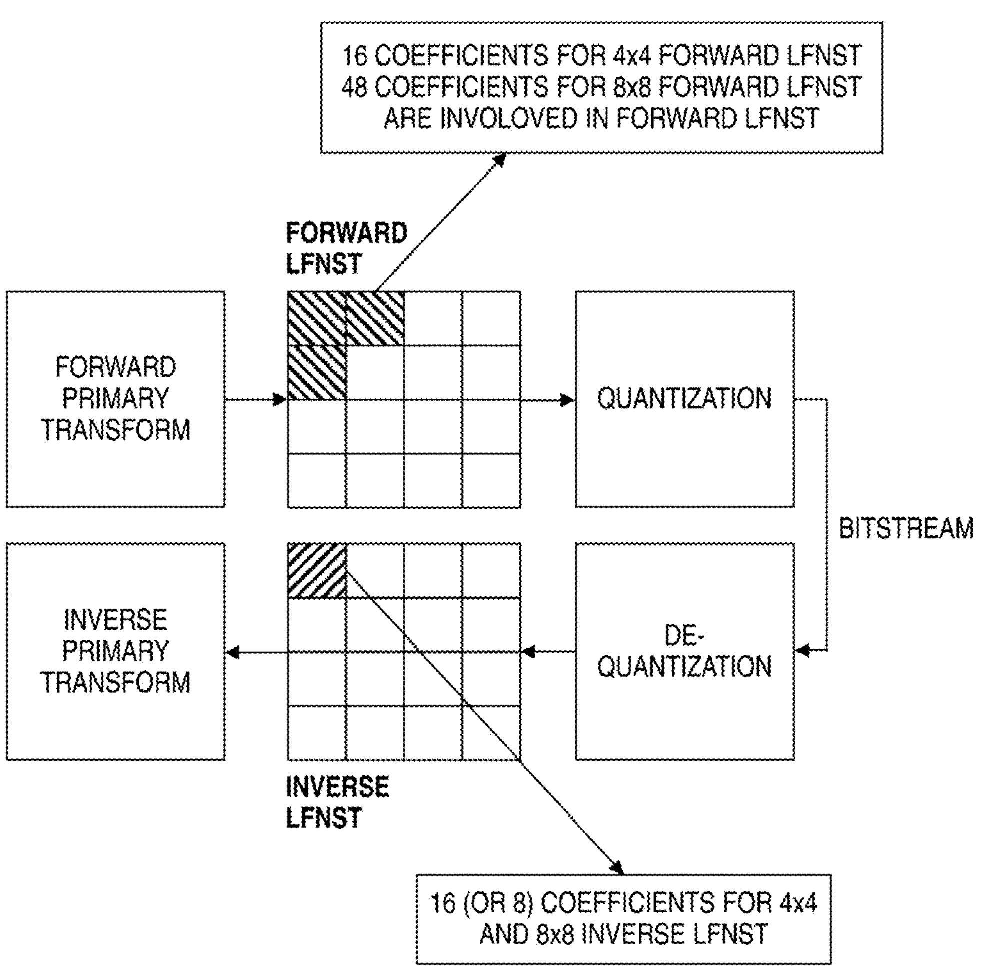
FIG. 8 shows exemplary forward LFNST process and inverse LFNST process in accordance with an embodiment.

FIG. 8 shows exemplary forward LFNST process and inverse LFNST process in accordance with an embodiment.

As shown in FIG. 8, the forward LFNST process may be applied as a secondary transform process between the forward primary transform process and the quantization process at the encoder side, and the inverse LFNST process may be applied as an inverse secondary transform process between de-quantization process and the inverse primary transform inverse as shown in FIG. 8. The LFNST is a non-separable transform process applied after the primary transform process is performed to further reduce redundancy.

The top-left low-frequency region of primary transform coefficients may be further transformed by the LFNST process. The top-left low-frequency region may be referred to as a region of interest (ROI). When the width of the current transform block is equal to or greater than 8 and the height of the current transform block is equal to or greater than 8, a top left 4×4 block of the current transform block, a 4×4 block located to the right of the top left 4×4 block, and a 4×4 block located below the top left 4×4 block may become the ROI and may be referred to as ROI8 in this disclosure. When the width of the current transform block is less than 8 or the height of the current transform block is less than 8, a top left 4×4 block of the current transform block may become the ROI and may be referred to as ROI4 in this disclosure.

The LFNST process utilizes 4 transform sets with 2 kernels per set. The transformation matrix applied for the size of the transform block (TB) greater than or equal to 8×8 may be referred to as LTNST8 in this disclosure. The transformation matrix utilized when TB width or height is 4 may be referred to as LFNST4 in this disclosure. The selection of LFNST set may be determined by an intra prediction mode. LFNST transform may be expressed in the form of matrix multiplication, which maps N dimensional matrix to R dimension vector with a R×N matrix. Each row of the matrix is an orthonormal basis of the N dimensional space, where 16×48 and 16×16 matrices are used for LFNST8 and LFNST4 respectively. The transpose of the matrix is used in the inverse LFNST process. When the LFNST process is applied, all primary transform coefficients except transform coefficients in the ROI8/ROI4 are zeroed out. The output of the LNFST process may be further quantized and entropy coded to generate a bitstream, and then the bitstream is transmitted. The inverse LFNST process transforms the decoded LFNST coefficients back to transform coefficients in ROI8/ROI4, after that the inverse primary transform processes are performed.

As described above, using the same LFNST transformation matrix in all circumstances without considering different features of a current block or a current picture may deteriorate video compression efficiency. For example, luma blocks and chroma blocks may have quite different data patterns of primary transformation coefficients. Using the same sets of LFNST transformation for Luma and Chroma Block may limit the coding performance. Furthermore, different sets of transformation for different QP setting may be able to further reduce the redundancy. Moreover, the resolution of the input video may also cause the different distribution of the primary transform coefficients. Adaptively choosing the sets of transformation matrices according to the video resolutions may also improve the coding performance.

A set of linear transformation matrices for LFNST may be designed to improve the coding efficiency by reducing the spatial redundancy of the low frequency primary transform coefficients located at the top left region of the transform block. The LFNST transformation is non-separable and data dependent. In VVC standard, the same transformation sets are used for all the different circumstances, which may be not the optimal solution due to variations of a block type such as a color component indicating whether the current transform block is a luma block or a chroma block, coding parameters such as quantization parameter (QP) levels, features of the input video such as the video resolution.

Hereinafter, better schemes to design the transformation sets for LFNST will be described.

The coefficients of primary transforms may have different patterns for Luma blocks and Chroma blocks. In some embodiments, different transformation sets for Luma and Chroma block may be used. For convenience, it may be referred to as splitLC. The transformation sets for different blocks can better capture the data distribution to more effectively remove the redundancy. To design the separate transformation matrices for luma and chroma blocks, the current design structure of LFNST may be used. Based on the size of the block, for each of color components including luma and chroma, LFNST8 and LFNST4 may be designed separately for large and small blocks. 4 sets of transformations and 2 kernel per set may be utilized for both LFNST8 and LFNST4 and for both luma blocks and chroma blocks. Each transformation matrix may be a linear transformation matrix, with R orthonormal bases in N dimension, where R=16, N=48 for $LFNST_8$ and R=16, N=16 for $LFNST_4$. The set may be selected based on an LFNST mode which is determined by the intra predication mode. The LFNST mode may be referred to as an LFNST set index. The kernel may be selected by an LFNST index which is signaled as a syntax element in the bitstream. The linear transformation may be designed to place as much energy as possible in as few coefficients as possible after the primary transform process, which is aligned with the idea of KLT. In some embodiments, KLT may be utilized to statistically design the LFNST transformation matrices from the data.

In some embodiments, firstly, the primary transform coefficients as well as their corresponding parameters including the LFNST mode, the LFNST index, the block size and the block type for all the blocks of a dataset may be logged. According to the block size, whether it is a $LFNST_4$ sample or $LFNST_8$ sample may be decided. Then the KLT can be used to solve the linear transformation matrices for each LFNST mode, each LFNST index and each block type including Luma block or Chroma block. For convenience, the primary transform coefficients for all the data samples with LFNST mode m, LFNST index i and block type t, block size belongs to $LENST_N$ may be represented as $U_N[t][m][i]$, where $t \in \{0,1\}$, $i \in \{0,1\}$, $m \in \{0,1,2,3\}$, $N \in \{4,8\}$. By applying eigen decomposition, i.e., $U_N[t][m][i]v=\lambda v$, where $\lambda$ is eigenvalue, the eigenvectors v may be determined. The transpose of the eigenvectors may be used to define the linear transformation matrix.

The eigenvectors v may be represented by floating numbers. To use the eigenvectors v in the video codec, the eigenvector v in the floating-point representation may be converted to a rounded linear transformation matrix T in fixed-point representation as shown in the following equation: T=round (v*f). The fixed-point conversion may lead to some issues. For example, the fixed-point conversion will cause some approximation error when the values in the eigenvector v are rounded to integer after being multiplied by a factor f. In some embodiments, the factor f may be equal to 128. Additionally, the fixed-point conversion may affect its orthogonality of the eigenvectors. In some embodiments, a specific greedy algorithm may be utilized to slightly adjust the transformation T by preserving its orthogonality. In some embodiments, ±1 may be applied to some elements of T. The input of the specific greedy algorithm may be the number of elements to be modified as the total number of iterations. In each iteration, only one element may be updated. The specific greedy algorithm may be used to determine which element to be updated in each iteration. In each iteration, 1 may be added to an associated element of the matrix T and the orthogonal metric $m=\|T'\cdot T'^{T}-I*f^2\|$ may be calculated, where T' is the transformation matrix T with the associated element added with +1, I is the identity metric, f is the converting factor. In the same iteration, 1 may be subtracted from the associated element of the matrix T and the orthogonal metric $m=\|T'\cdot T'-I*f^2\|$ may be calculated, where T' is the transformation matrix T with the associated element added with −1, may be calculated. In general, if T' is orthogonal, then m=0. The smaller m is, then T' is closer to orthogonal. In each iteration, one element may be updated by choosing an element with the least m between the element added with +1 and the element added with −1. In some embodiments, the number of elements to be modified may be set differently to get a set of different transformation matrices, which may be tested in the evaluation to find the best one. In experiments, it has been found that some small updates can improve the coding performance.

When the above design schemes are used to get the sets of transformation matrix for splitLC scheme, the coding performance can be improved by 0.07% compared to the VTM software as shown in Table 1.

Table 1 shows coding performance of splitLC in LFNST over VVC test model 19.2 (VTM-19.2) for all intra Main10 profiles.

TABLE 1

| | Y | U | V |
|---|---|---|---|
| Class A1 | −0.02% | −0.13% | 0.04% |
| Class A2 | −0.11% | 0.12% | 0.01% |
| Class B | −0.07% | −0.10% | 0.22% |
| Class C | −0.09% | 0.08% | −0.06% |
| Class E | −0.07% | −0.13% | −0.88% |
| Overall | −0.07% | −0.03% | −0.09% |
| Class D | −0.05% | 0.35% | 0.29% |
| Class F | −0.08% | 0.60% | −0.81% |

In some embodiments, different sets of transformation matrices based on QP level may be utilized. For convenience, it may be referred to as splitQP. When the linear transformation matrices are designed, the dataset samples for different QP values may be further separated. In some embodiments, the QP values may be separated to a plurality of segments. For example, the number of the segments may be 4. In some embodiments, the segments of the QP level may include (0,22], (22,27], (27,32], and (32, ∞). For each of the QP segments, the same method may be used to deduce the linear transformation matrices with KLT. The linear transformation matrix may be denoted as Top, where QP∈{22,27,32,37}. The transformation matrix T may be determined based on the QP value q used in the quantizer 440, the inverse quantizer 460, or the inverse quantizer 505, as shown in Equation 5.

$$T=\begin{cases}T_{22} & \text{if } 0<q\le 22\\ T_{27} & \text{if } 22<q\le 27\\ T_{32} & \text{if } 27<q\le 32\\ T_{37} & \text{if } 32<q\end{cases} \quad \text{Equation 5}$$

In some embodiments, other ways to segment the QP values can be tried as well. Besides that, when generating the data samples for each segment, a random QP value inside the range can be used to increase diversity. The coding performance after applying splitQP can be improved by 0.08% compared to the VVC software as shown in Table 2.

Table 2 shows coding performance of splitQP in LFNST over VVC test model 19.2 (VTM-19.2) for all intra Main10 profiles.

TABLE 2

| | Y | U | V |
|---|---|---|---|
| Class A1 | −0.11% | −0.05% | 0.01% |
| Class A2 | −0.06% | 0.09% | −0.01% |
| Class B | −0.10% | 0.18% | 0.40% |
| Class C | −0.05% | 0.05% | −0.03% |
| Class E | −0.07% | −0.03% | −0.63% |
| Overall | −0.08% | 0.06% | 0.00% |
| Class D | −0.05% | 0.34% | 0.56% |
| Class F | −0.17% | 0.13% | −0.69% |

In some embodiments, the splitLC and splitQP may be combined. In this scenario, different sets of transformation matrices for Luma and Chroma blocks and QP setting may be designed. And the corresponding set of transformation is used in the codec given the block type and QP values. The coding performance can be further improved by 0.09% compared to VVC software as shown in Table 3.

Table 3 shows coding performance of LFNST where splitLC and splitQP are combined over VVC test model 19.2 (VTM-19.2) for all intra Main10 profiles.

TABLE 3

| | Y | U | V |
|---|---|---|---|
| Class A1 | −0.10% | −0.35% | −0.11% |
| Class A2 | −0.10% | 0.02% | 0.00% |
| Class B | −0.06% | 0.07% | 0.14% |
| Class C | −0.11% | −0.20% | −0.07% |
| Class E | −0.07% | −0.37% | −0.29% |
| Overall | −0.09% | −0.14% | −0.04% |
| Class D | −0.05% | 0.38% | 0.48% |
| Class F | −0.11% | 0.02% | −0.37% |

In some embodiments, the LFNST transformation matrices sets may be optimized for different video resolutions. The coding performance can be further improved as shown in Table 4.

Table 4 shows coding performance of the adaptive LFNST transformation for different videos over VVC test model 19.2 (VTM-19.2) for all intra Main10 profiles.

TABLE 4

| | Y | U | V |
|---|---|---|---|
| Class A1 | −0.10% | −0.35% | −0.11% |
| Class A2 | −0.10% | 0.02% | 0.00% |

TABLE 4-continued

| | Y | U | V |
|---|---|---|---|
| Class B | −0.10% | 0.18% | 0.40% |
| Class C | −0.11% | 0.06% | −0.04% |
| Class E | −0.10% | 0.36% | 0.29% |
| Overall | −0.10% | 0.07% | 0.13% |
| Class D | −0.13% | 0.61% | 0.21% |
| Class F | −0.13% | 0.52% | −0.52% |

In some embodiments, the set of LFNST transformation matrices may be adaptively chosen based on an input video resolution. In some embodiments, a neural network may be trained to choose the best set of LFNST transformation matrices based on the other parameter or characteristic of the input video. The neural network has been proved to be super powerful to extract the structure and content information from image and video. Based on those extracted features, the transformation matrices may be tailored to further reduce the redundancy.

In some embodiments, the sets of LFNST transformation matrices may represent all linear transformation. In some embodiments, non-linear transformation may be modeled to further improve the coding efficiency. In some embodiments, the advanced neural network techniques may be used to model the transformation coding to further reduce the redundancy while preserving the coding accuracy.

Hereinafter, the operation of the transformation processor 600 will be described with reference to FIG. 9.

Figure 9:
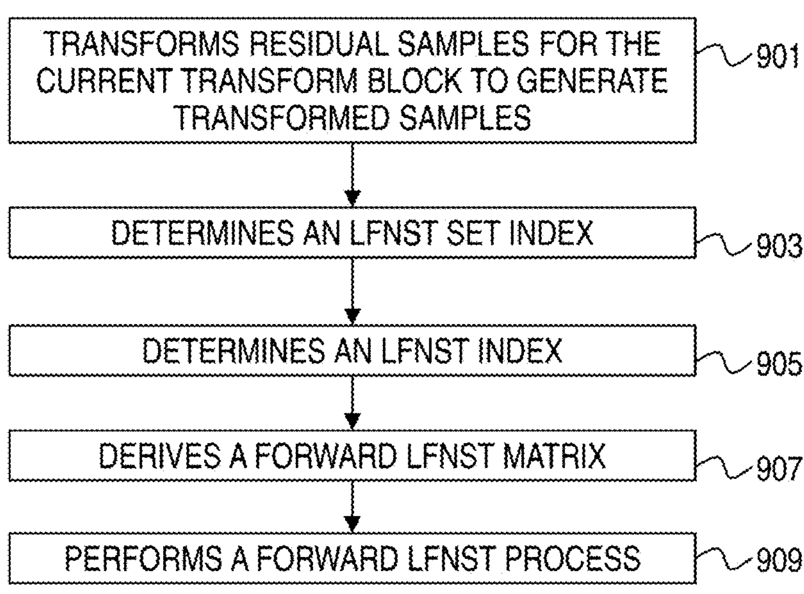
FIG. 9 is a flow chart showing the operation of the transformation processor in accordance with an embodiment.

FIG. 9 is a flow chart showing the operation of the transformation processor in accordance with an embodiment.

As shown in FIG. 9, the transformation processor 600 transforms residual samples for the current transform block to generate transformed samples for the current transform block at 901.

The transformation processor 600 determines an LFNST set index for the current transform block based on the intra predication mode for the current transform block at 903.

The transformation processor 600 determines an LFNST index in the bitstream at 905.

The transformation processor 600 derives a forward LFNST matrix based on at least one of a size of the current transform block, the LFNST set index, the LFNST index, one or more block types of the current transform block, one or more coding parameters for the current transform block, or one or more input video features, at 907. In some embodiments, the block type may include color component information indicating whether the current transform block is a luma block or a chroma block and the transformation processor 600 may derive the forward LFNST matrix based on the color component information of the current transform block. In some embodiments, the coding parameters may include a quantization parameter used in the inverse quantizer 505. In some embodiments, the transformation processor 600 may determine a quantization parameter segment index QP based on the quantization parameter used in the inverse quantizer 505 and derive the forward LFNST matrix based on the quantization parameter segment index. For example, QP∈{22,27,32,37}. In some embodiments, the one or more input video features may include a resolution of the input video and the transformation processor 600 may derive the forward LFNST matrix based on the resolution of the input video.

The transformation processor 600 performs a forward LFNST process by applying the forward LFNST matrix to the transformed samples for the current transform block to generate transform coefficients for the current transform block at 909.

Hereinafter, the operation of the inverse transformation processor 700 will be described with reference to FIG. 10.

Figure 10:
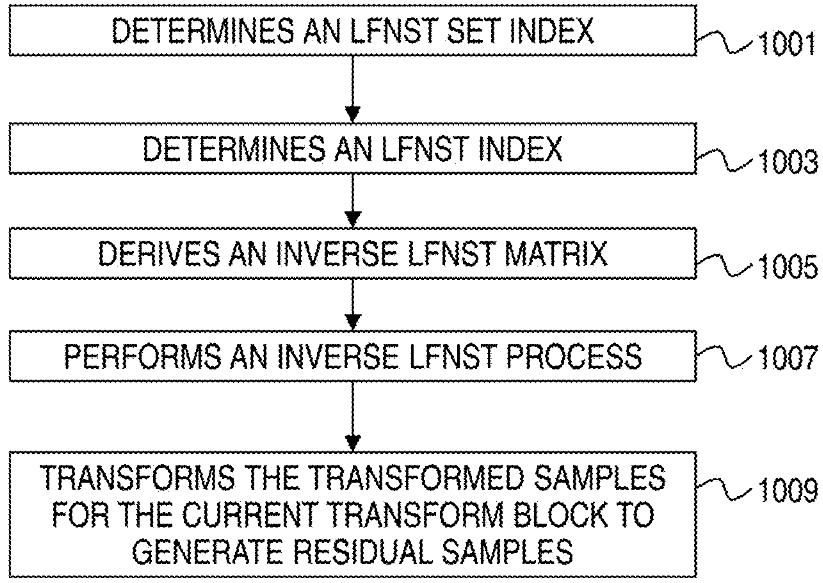
FIG. 10 is a flow chart showing the operation of the inverse transformation processor in accordance with an embodiment.

FIG. 10 is a flow chart showing the operation of the inverse transformation processor in accordance with an embodiment.

Referring to FIG. 10, the inverse transformation processor 700 determines an LFNST set index for the current transform block based on the intra predication mode for the current transform block at 1001.

The inverse transformation processor 700 determines an LFNST index based on a syntax element in the bitstream at 1003.

The inverse transformation processor 700 derives an inverse LFNST matrix based on at least one of a size of the current transform block, the LFNST set index, the LFNST index, one or more block types of the current transform block, one or more coding parameters for the current transform block, or one or more input video features, at 1005. In some embodiments, the block type may include color component information indicating whether the current transform block is a luma block or a chroma block and the inverse transformation processor 700 may derive the inverse LFNST matrix based on the color component information of the current transform block. In some embodiments, the coding parameters may include a quantization parameter used in the inverse quantizer 505. In some embodiments, the inverse transformation processor 700 may determine a quantization parameter segment index QP based on the quantization parameter used in the inverse quantizer 505 and derive the inverse LFNST matrix based on the quantization parameter segment index. For example, QP∈{22,27,32,37}. In some embodiments, the one or more input video features may include a resolution of the input video and the inverse transformation processor 700 may derive the inverse LFNST matrix based on the resolution of the input video. In some embodiments, the inverse LFNST matrix may be a transpose of the forward LFNST matrix for the same factors used in deriving the LFNST matrix.

The inverse transformation processor 700 performs an inverse LFNST process by applying the derived inverse LFNST matrix to dequantized transform coefficients for the current transform block to generate transformed samples for the current transform block at 1007. In some embodiments, the inverse transformation processor 700 applies the derived inverse LFNST matrix lowFreqTransMatrix[i][j] (i=0 . . . nTrS−1, j=0 . . . nonZeroSize−1) to dequantized transform coefficients x[j] to generate transformed samples y[i], where the variable nTrS specifies a transform output length indicating the number of transformed samples and The variable nonZeroSize specifies a transform input length indicating the number of dequantized transform coefficients, as shown in Equation 6.

$$y[i] = Clip3\Big(CoeffMin, CoeffMax, \Big(\Big(\sum_{j=0}^{nonZeroSize-1} lowFreqTransMatrix[i][j] * x[j]\Big) + 64\Big) \gg 7\Big) \quad \text{Equation 6}$$

In Equation 6, the function Clip3(x, y, z) returns x if z<x, y if z>y, and z otherwise. The variables CoeffMin and CoeffMax specify the minimum and maximum transform coefficient values.

The inverse transformation processor 700 transforms the transformed samples for the current transform block to generate residual samples for the current transform block at 1009.

The various illustrative blocks, units, modules, components, methods, operations, instructions, items, and algorithms may be implemented or performed with processing circuitry.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The term "exemplary" is used to mean serving as an example or illustration. To the extent that the term "include," "have," "carry," "contain," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, the description may provide illustrative examples and the various features may be grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The embodiments are provided solely as examples for understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus comprising:

a communication interface configured to receive a compressed bitstream including one or more syntax elements for transform coefficients for a current block; and a processor operably coupled to the communication interface, the processor configured to cause:

decoding the one or more syntax elements for transform coefficients to generate transform coefficients for the current block, dequantizing the transform coefficients to generate dequantized transform coefficients for the current block, deriving a low frequency non-separable secondary transform (LFNST) matrix based on a block type of the current block using a quantization parameter value and a quantization parameter segment, performing an LFNST process by applying the derived LFNST matrix to the dequantized transform coefficients to generate transformed samples for the current block, and transforming the transformed samples to generate residual samples for the current block.

2. The apparatus of claim 1, wherein the block type specifies a color component indicating whether the current block is a luma block or a chroma block.

3. The apparatus of claim 1, wherein the LFNST matrix is derived further based on a coding parameter.

4. The apparatus of claim 3, wherein the transform coefficients are dequantized based on a quantization parameter, and the coding parameter indicates the quantization parameter.

5. The apparatus of claim 4, wherein the processor is further configured to cause:

determining a quantization parameter segment information indicating which segment the quantization parameter belongs to, and the LFNST matrix is derived further based on the quantization parameter segment information.

6. The apparatus of claim 1, wherein the LFNST matrix is derived further based on a feature of an input video.

7. The apparatus of claim 6, wherein the feature of the input video indicates a resolution of the input video.

8. The apparatus of claim 1, wherein the processor is further configured to cause:

determining an LFNST index based on a syntax element in the compressed bitstream, and the LFNST matrix is derived further based on the LFNST index.

9. The apparatus of claim 1, wherein the processor is further configured to cause:

performing an intra prediction process based on an intra prediction mode to generate prediction samples for the current block, and the LFNST matrix is derived further based on the intra prediction mode.

10. The apparatus of claim 9, wherein the processor is further configured to cause:

combining the residual samples with the prediction samples to generate reconstructed samples for a current picture including the current block.

11. A video decoding method comprising:

receiving a compressed bitstream including one or more syntax elements for transform coefficients for a current block;

decoding the one or more syntax elements for transform coefficients to generate transform coefficients for the current block;

dequantizing the transform coefficients to generate dequantized transform coefficients for the current block;

deriving a low frequency non-separable secondary transform (LFNST) matrix based on a block type of the current block using a quantization parameter value and a quantization parameter segment;

performing an LFNST process by applying the derived LFNST matrix to the dequantized transform coefficients to generate transformed samples for the current block; and transforming the transformed samples to generate residual samples for the current block.

12. The video decoding method of claim 11, wherein the block type specifies a color component indicating whether the current block is a luma block or a chroma block.

13. The video decoding method of claim 11, wherein the transform coefficients are dequantized based on a quantization parameter, and the LFNST matrix is derived further based on the quantization parameter.

14. The video decoding method of claim 11, wherein the LFNST matrix is derived further based on a resolution of an input video.

15. The video decoding method of claim 11, further comprising:

performing an intra prediction process based on an intra prediction mode to generate prediction samples for the current block; and combining the residual samples with the prediction samples to generate reconstructed samples for a current picture including the current block, wherein the LFNST matrix is derived further based on the intra prediction mode.

16. An apparatus comprising:

a processor configured to cause:

transforming residual samples for a current block to generate transformed samples for the current block, deriving a low frequency non-separable secondary transform (LFNST) matrix based on a block type of the current block using a quantization parameter value and a quantization parameter segment, applying the derived LFNST matrix to the transformed samples to generate transform coefficients for the current block, quantizing the transform coefficients to generate quantized transform coefficients for the current block, and encoding with the quantized transform coefficients to generate one or more syntax elements for quantized transform coefficients for the current block; and a communication interface operably coupled to the processor, the communication interface configured to transmit the compressed bitstream including the one or more syntax elements for quantized transform coefficients for the current block.

17. The apparatus of claim 16, wherein the block type specifies a color component indicating whether the current block is a luma block or a chroma block.

18. The apparatus of claim 16, wherein the transform coefficients are dequantized based on a quantization parameter, and the LFNST matrix is derived further based on the quantization parameter.

19. The apparatus of claim 16, wherein the LFNST matrix is derived further based on a resolution of an input video.

20. The apparatus of claim 16, wherein the processor is further configured to cause:

performing an intra prediction process based on an intra prediction mode to generate prediction samples for the current block; and generating the residual samples for the current block based on the prediction samples and original samples for the current block, wherein the LFNST matrix is derived further based on the intra prediction mode.

* * * * *